United States Patent
Aouaini et al.

(10) Patent No.: US 12,210,758 B2
(45) Date of Patent: Jan. 28, 2025

(54) METHOD, SYSTEM, AND CIRCUIT FOR DEPLOYING FILE SYSTEM ON EMBEDDED MEMORY IN PROGRAMMABLE COMPUTING DEVICE

(71) Applicant: STMicroelectronics France, Montrouge (FR)

(72) Inventors: Zouhaier Aouaini, Ariana (TN); Haithem Rahmani, Ariana (TN)

(73) Assignee: STMicroelectronics France, Montrouge (FR)

( * ) Notice: Subject to any disclaimer, the term of this patent is extended or adjusted under 35 U.S.C. 154(b) by 259 days.

(21) Appl. No.: 17/733,779

(22) Filed: Apr. 29, 2022

(65) Prior Publication Data
US 2023/0350593 A1 Nov. 2, 2023

(51) Int. Cl.
*G06F 3/06* (2006.01)
*G06F 16/18* (2019.01)

(52) U.S. Cl.
CPC .......... *G06F 3/0643* (2013.01); *G06F 3/0604* (2013.01); *G06F 3/064* (2013.01); *G06F 3/0659* (2013.01); *G06F 3/0679* (2013.01); *G06F 16/1847* (2019.01)

(58) Field of Classification Search
CPC ...... G06F 3/0643; G06F 3/0604; G06F 3/064; G06F 3/0659
USPC ......................................................... 707/824
See application file for complete search history.

(56) References Cited

U.S. PATENT DOCUMENTS

| | | | |
|---|---|---|---|
| 7,409,330 B2 * | 8/2008 | Kumamoto | G06F 11/362 717/124 |
| 7,614,051 B2 | 11/2009 | Glaum et al. | |
| 8,589,700 B2 | 11/2013 | Herman et al. | |
| 9,165,143 B1 * | 10/2015 | Sanders | G06F 21/575 |
| 10,853,503 B2 * | 12/2020 | Lee | G06F 21/78 |
| 11,138,346 B2 * | 10/2021 | Gulati | G06F 21/78 |
| 11,256,437 B2 * | 2/2022 | Walker | G06F 3/0647 |
| 2008/0209114 A1 * | 8/2008 | Chow | G06F 12/0804 711/E12.001 |
| 2008/0256135 A1 * | 10/2008 | Nelson | G06F 30/33 |
| 2009/0055452 A1 * | 2/2009 | Tang | G06F 16/1815 |

(Continued)

FOREIGN PATENT DOCUMENTS

CN 101425041 A 5/2009

OTHER PUBLICATIONS

GitHub, "Project Requirements we should consider #6," URL=https://github.com/Open-CMSIS-Pack/Open-CMSIS-Pack-Spec/issues/6, download date May 13, 2022, 6 pages.

(Continued)

*Primary Examiner* — Hosain T Alam
*Assistant Examiner* — Nicholas E Allen
(74) *Attorney, Agent, or Firm* — Seed IP Law Group LLP

(57) ABSTRACT

System, method, and circuitry for simulating a memory architecture to generate a bin image of a file tree for a memory embedded on a programmable computing device. A memory configuration of the memory and a file tree identifying a file structure to be used in the memory are obtained. A bin image of a file system for the memory is generated based on the memory configuration and the file tree using a memory simulator and a file-management-system manager. The bin image is provided to the programmable computing device for storage in the memory.

20 Claims, 3 Drawing Sheets

(56) References Cited

U.S. PATENT DOCUMENTS

| | | | | |
|---|---|---|---|---|
| 2016/0077968 | A1* | 3/2016 | Sela | G06F 12/0246 |
| | | | | 711/118 |
| 2018/0293174 | A1* | 10/2018 | Song | G06F 12/1009 |
| 2023/0350593 | A1* | 11/2023 | Aouaini | G06F 3/0604 |

OTHER PUBLICATIONS

Github, STMicroelectronics/STM32CubeU5, URL=https://github.com/STMicroelectronics/STM32CubeU5/tree/main/Projects/B-U585I-IOT02A/Applications/NetXDuo/Nx_WebServer/Web_Content, download date May 13, 2022, 1 page.

Github, STMicroelectronics/x-cube-azrtos-f4, URL=https://github.com/STMicroelectronics/x-cube-azrtos-f4/tree/main/Projects/STM32F429ZI-Nucleo/Applications/NetXDuo/Nx_WebServer/Web_Content, download date May 13, 2022, 1 page.

* cited by examiner

METHOD, SYSTEM, AND CIRCUIT FOR DEPLOYING FILE SYSTEM ON EMBEDDED MEMORY IN PROGRAMMABLE COMPUTING DEVICE

BACKGROUND

Technical Field

The present disclosure generally relates to electronic devices of the type often used in embedded applications. More particularly, but not exclusively, the present disclosure relates to generating and storing a file system on the memory of a programmable computing device.

Description of the Related Art

SoCs (system on a chip) are becoming more complex and often utilize a microcontroller unit and different memories and configurations. One such memory may include an embedded NOR flash memory. The microcontroller unit can directly access 'raw data' written on the NOR flash memory. However, file and folder storage generally requires a file system that has a specific low-level interface that is used to read and write data to the memory. Because the NOR memory is embedded on the board, it is generally not possible to preinstall a file system on the memory without running an application on the microcontroller unit to interact with the memory. This complexity makes it difficult to utilize file systems on a NOR flash memory that is embedded in a SoC. It is with respect to these and other considerations that the embodiments described herein have been made.

BRIEF SUMMARY

Embodiments described herein generate a bin image of a file system that is to be stored on the memory of a programmable computing device without having the programmable computing device generate or maintain the file system itself. In some embodiments, a graphical user interface may be utilized such that the user can select or identify the programmable computing device or the memory that is embedded on the programmable computing device.

A memory configuration for the memory that is embedded on the programmable computing device is determined. In some embodiments, the memory configuration information may be determined by determining a total size of the memory, determining a block size of the memory, determining a page size of the memory, determining a memory type of the memory; determining the hardware architecture of the memory; or some combination thereof.

A file tree identifying a file structure to be used in the memory is obtained. The system can then generate a bin image of a file system for the memory based on the memory configuration and the file tree using a memory simulator and a file-management-system manager. The bin image may be generated by obtaining file allocation table information via the file-management-system manager and employing the memory simulator to generate the bin image by simulating writing of the file tree to the memory using the memory configuration and the file allocation table information. The bin image is stored in the memory that is embedded on the programmable computing device. In some embodiments, a second memory of a second programmable computing device having a second memory configuration that matches the memory configuration of the memory is identified and the bin image is stored in the second memory that is embedded on the second programmable computing device.

Embodiments described herein result in an improvement to the functioning of programmable computing devices by enabling an efficient mechanism to generate and utilize a file system in an embedded memory on the programmable computing device without requiring the programmable computing device to employ its own resources to generate the file system.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, memories, bus systems, etc., have not been shown or described in in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context requires otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
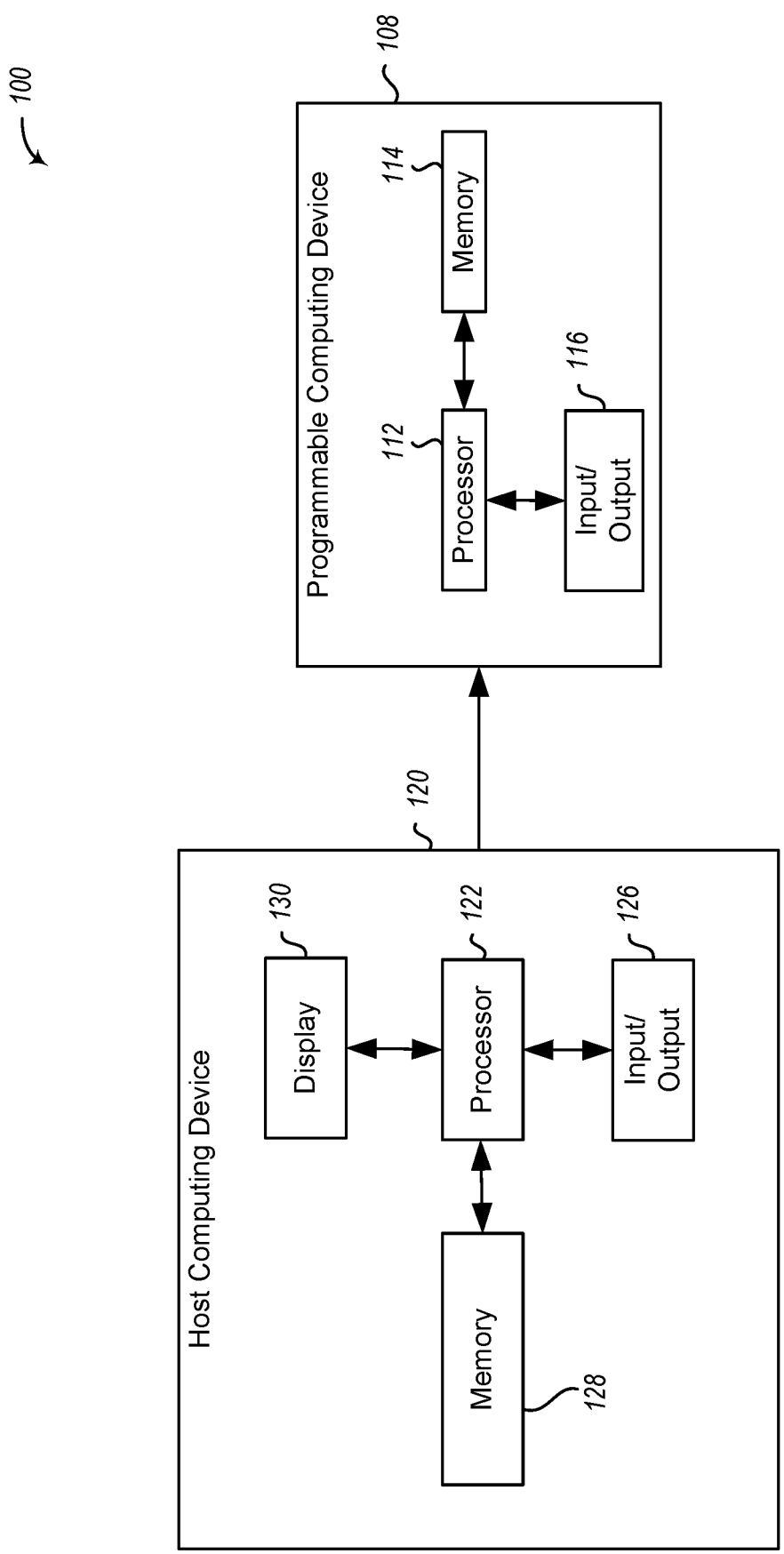
FIG. 1 is a block diagram showing an example computing environment for implementing embodiments described herein.

FIG. 1 is a block diagram showing an example computing environment 100 for implementing embodiments described herein. Environment 100 includes a programmable computing device 108 and a host computing device 120.

The programmable computing device 108 has a processor 112, memory 114, and input/output peripherals 116. Although not illustrated, computing device 108 may have other computing components, such as additional memories, graphics processing units, wireless network modules, analog-to-digital converters, microelectromechanical systems, other sensors, etc. In various embodiments, the programmable computing device 108 may be referred to as a System on a Chip (SoC).

The programmable computing device 108 may be a microprocessor, microcontroller, or other computer device that is or contains an integrated circuit having a programmable interface. The processor 112 includes one or more central processing units or processor cores. In some embodiments, the processor 112 may include a state machine, a microprocessor, a programmable logic circuit, discrete circuitry, logic gates, registers, etc. The processor 112 may control overall operation of the programmable computing device 108, execution of applications programs by the programmable computing device 108, etc.

The programmable computing device 108 also includes one or more memories 114, such as one or more volatile or non-volatile memories, or a combination thereof. In at least one embodiment, the memory 114 may include a NOR flash memory. As described herein, programmable computing device 108 may store a bin image of a file tree that it received from the host computing device 120. When an application executing on the programmable computing device 108 needs access to data stored within the bin image of the memory, the application utilizes a memory interface (e.g., a NOR flash memory interface) to access the bin image and obtain the data.

The memory 114 may also store instructions and data related to applications and operations performed by the programmable computing device 108. For example, the memory 114 may store computer instructions that when executed by the processor 112, cause the programmable computing device 108 to perform a desired function. The memory 114 may also store information that is used to configure the hardware of the programmable computing device 108.

The input/output peripherals 116 may include one or more general purpose input/output pins, dedicated input or output interfaces (e.g., serial input/output ports), wireless interfaces, etc. In some embodiments, input/output peripherals 116 may be configured to receive input data from other computing devices, such as host computing device 120, or may be configured to provide output data to other computing devices.

The programmable computing device 108 may also include a bus system (not illustrated), which may be configured such that the processor 112, input/output peripherals 116, one or more memories 114, or other circuits or circuitry (not illustrated) are communicatively coupled to one another to send or receive, or send and receive, data to or from other components. The bus system may include one or more of data, address, power, or control busses, or some combination thereof, electrically coupled to the various components of the programmable computing device 108.

The host computing device 120 includes a processor 122, an input/output interface 126, and a memory 128. The host computing device 120 is configured to employ embodiments described herein to generate a bin image of a file tree to be stored on the memory 114 of the programmable computing device 108.

Processor 122 may include one or more processors that are configured to execute computer instructions to employ embodiments described herein. For example, the host computing device 120 can identify the programmable computing device 108 and the memory 114, such as by communicating with the programmable computing device 108 or by receiving a user selection via a graphical user interface. Various characteristics or memory configuration information regarding the memory 114 may be determined and used, along with a memory simulator and a file-management-system manager, to generate a bin image of a file tree. The host computing device 120 can provide, e.g., via input/output interface 126, the generated bin image to the programmable computing device 108 for storage in the memory 114 on the programmable computing device 108.

Memory 128 may include one or more various types of non-volatile and/or volatile storage technologies. Examples of memory 128 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 128 may be utilized to store information, including computer-readable instructions that are utilized by processor 122 to perform actions, including embodiments described herein.

Input/output interface 126 may include one or more other data input or output interfaces. For example, the input/output interface 126 may include or provide data to a display device 130, which can be used to present the graphical user interface to the user. The input/output interface 126 can accept input from the user to select the programmable computing device 108, the memory 114, or other information, as described herein. In various embodiments, input/output interface 126 is configured to provide a generated bin image to the programmable computing device 108, as described herein.

Figure 2:
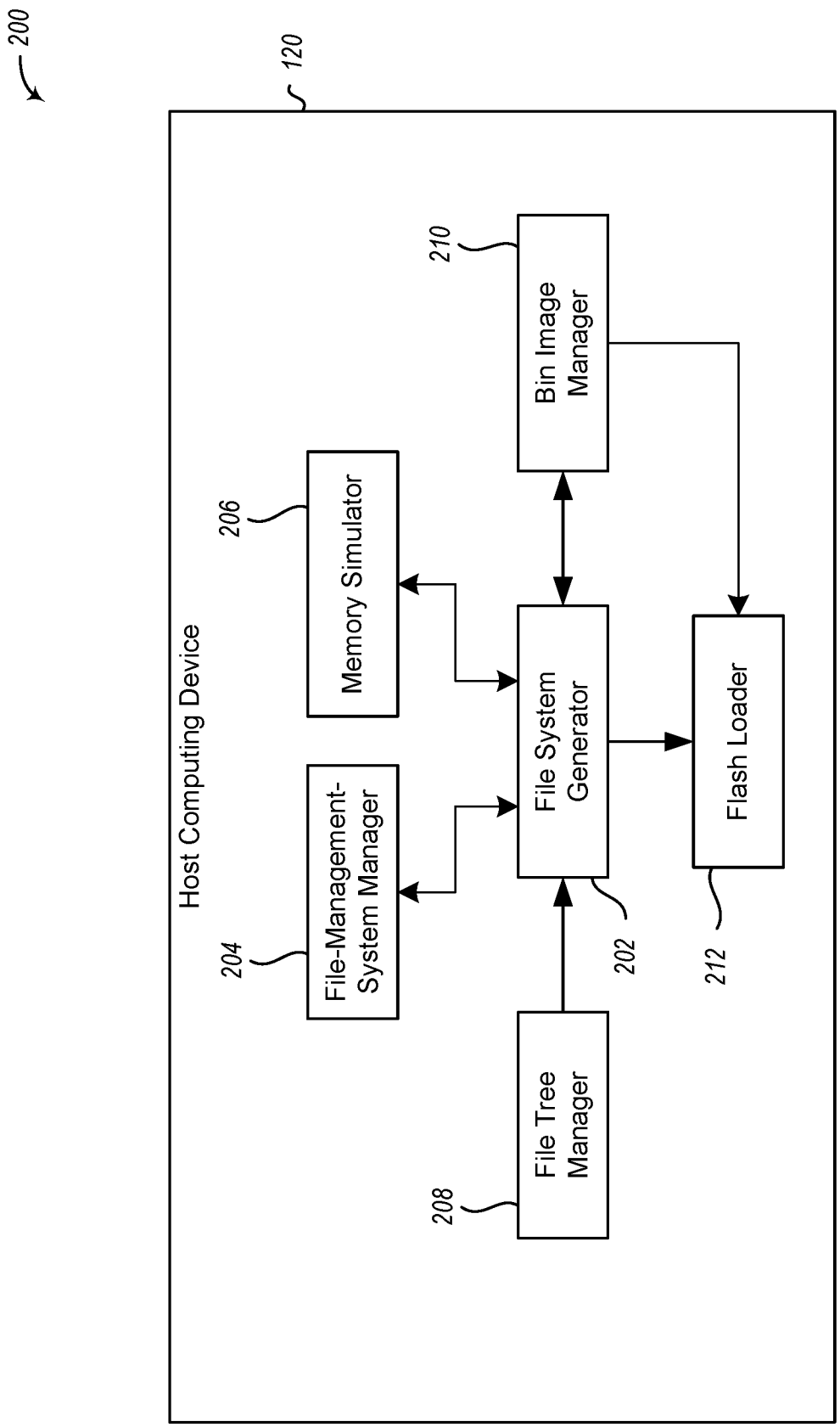
FIG. 2 is a block diagram showing an example conceptual structure of components for generating a file system for a memory embedded on a programmable computing device in accordance with embodiments described herein.

FIG. 2 is a block diagram showing an example conceptual structure 200 of components for generating a file system for a memory embedded on a programmable computing device in accordance with embodiments described herein. Example conceptual structure 200 may be implemented by or executed on one or more computing devices, such as host computing device 120 in FIG. 1, which is in communication with or can be in communication with the programmable computing device 108 in FIG. 1. In various embodiments, example conceptual structure 200 is not implemented by or executed on the programmable computing device itself; rather, it is hosted by a computing device that is separate from the programmable computing device.

Example conceptual structure 200 includes a file system generator 202, a file-management-system manager 204, a memory simulator 206, a file tree manager 208, a bin image manager 210, and a flash loader 212.

The file-management-system manager 204 is configured to manage or maintain details or information regarding a file system, which can be used by a computing system to make or manage a file system. In at least one embodiment, the file-management-system manager 204 may be an interface that enables the file system generator 202 to access a third party file management system, such as FileX and LevelX.

The memory simulator 206 is configured to perform operations that mimic the reading and writing functionality of the programmable computing device to a particular memory of the programmable computing device. In some embodiments, the memory simulator 206 may receive the memory configuration information from the file system generator and mimic the memory of the programmable computing device based on that memory configuration information. In other embodiments, the memory simulator 206 may include multiple sub-simulators that are each separately configured to simulate different types or structures of memories. In at least one such embodiment, the sub-simulators may utilize some of the memory configuration information to account for specific variations in memory characteristics of a particular memory.

The file tree manager 208 is configured to generate, maintain, or obtain a file tree that is to be stored on in the memory of the programmable computing device.

The bin image manager 210 is configured to store or maintain a bin image that is generated by the file system generator 202. In some embodiments, the bin image manager, 210 or the memory simulator 206 may ensure that the bin image size does not exceed the actual size of the memory that it is to be stored on in the programmable computing device. If the bin image is too large for the memory, then the loading of the bin image onto the programmable computing device will likely be incomplete or fail all together.

The flash loader 212 is configured to provide the generated bin image to the programmable computing device when the programmable computing device is in communication with the host computing device 120, which may be at the time the bin image is generated or at some later time after the bin image is generated.

The file system generator 202 is configured to obtain a file tree from the file tree manager 208 and to generate a bin image from the file tree using the file-management-system manager 204 and the memory simulator 206. Once the bin image is generated it can be stored by the bin image manger 210. When the programmable computing device is in communication with the host computing device 120, the file system generator 202 utilizes the flash loader 212 to load or store the bin image on the memory of the programmable computing device. In some embodiments, the bin image manager 210 may coordinate the storing of the bin image on the memory of the programmable computing device without the file system generator 202.

One or more of the file system generator 202, the file-management-system manager 204, the memory simulator 206, the file tree manager 208, the bin image manager 210, and the flash loader 212 may be implemented as modules or components executing in, on, or by software or hardware or a combination of software and hardware. Although the file system generator 202, the file-management-system manager 204, the memory simulator 206, the file tree manager 208, the bin image manager 210, and the flash loader 212 are illustrated as separate modules or components, embodiments are not so limited. Rather, the functionality of one or more or the file system generator 202, the file-management-system manager 204, the memory simulator 206, the file tree manager 208, the bin image manager 210, and the flash loader 212 may be combined and implemented by one module or component or by a plurality of modules or components.

The operation of one or more embodiments will now be described with respect to FIG. 3, and for convenience will be described with respect to the embodiments of FIGS. 1 and 2 described above. In at least one of various embodiments, process 300 described in conjunction with FIG. 3 may be implemented by or executed on one or more computing devices, such as host computing device 120 in FIG. 1.

Figure 3:
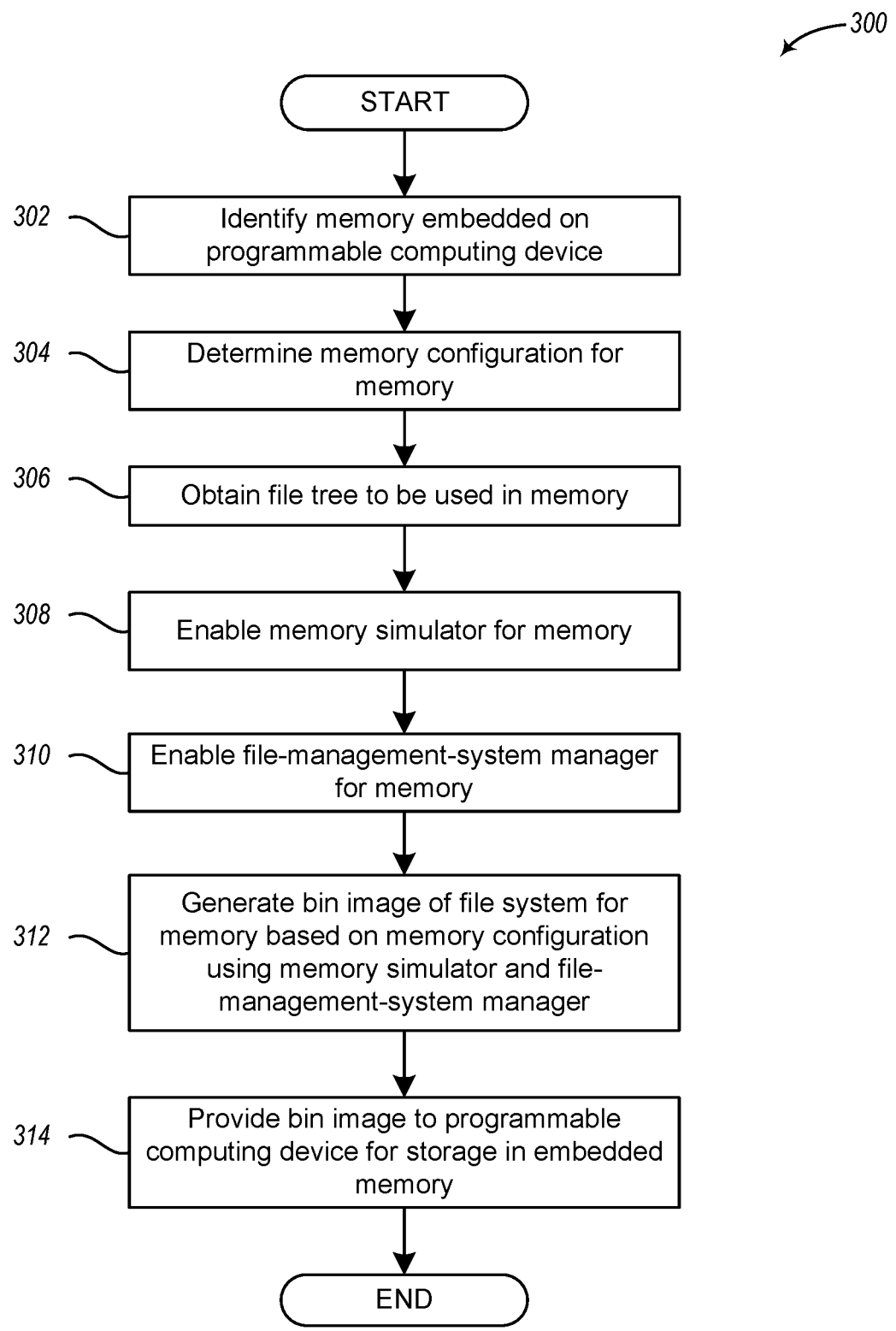
FIG. 3 shows a logical flow diagram of a process for generating a file system for a memory embedded on a programmable computing device in accordance with embodiments described herein.

FIG. 3 shows a logical flow diagram of a process 300 for generating a file system for a memory embedded on a programmable computing device in accordance with embodiments described herein.

Process 300 begins, after a start block, at block 302, where a memory embedded on a programmable computing device is identified. In various embodiments, a graphical user interface may be presented to a user to enable the user to select, define, or identify the memory. In some embodiments, the graphical user interface may present a list of a plurality of different embedded memories to the user. The user can then select a memory from the list of embedded memories. In other embodiments, the graphical user interface may present a list of a plurality of different programmable computing devices from which the user can select. In response to the user selecting a programmable computing device from the list, the system can identify the corresponding embedded memory for the selected programmable computing device, such as by accessing a database that maps or identifies which memories are embedded in different programmable computing devices.

In at least one embodiment, the memory is a NOR flash memory on the programmable computing device. Although embodiments are described herein as using an embedded memory of a programmable computing device, embodiments are not so limited. In some embodiments, the memory may not be embedded but is otherwise accessible to the programmable computing device.

Process 300 proceeds to block 304, where a memory configuration of the memory is determined. The memory configuration may include details regarding the hardware structure or architecture of the memory, the type of memory, the total size of the memory, the paging format utilized by the memory, the page size, the block size, etc. In various embodiments, a database may store the memory configurations for a plurality of different memories.

Process 300 continues at block 306, where a file tree that is to be used in the memory is obtained. In some embodiments, the user may input the file tree. In other embodiments, the file tree may be accessed or received from another computing device in which the user has previously generated the file tree. The file tree may include a directory, metadata defining the filing format or structure, or other information identifying how files are to be stored. In some embodiments, the file tree may also include the files themselves.

Process 300 proceeds next to block 308, where a memory simulator for the memory is enabled. In some embodiments, the memory simulator may include information, directions, modules, or other software or hardware components, that mimic the use of the memory of the programmable computing device. This mimicry may include simulating reads or writes to the memory, or any other instructions that can be performed on or with the memory.

In some embodiments, a plurality of memory simulators may be maintained and the memory simulator for the specific embedded memory and memory configuration may be selected from the plurality of memory simulators. In at least one embodiment, the memory simulator may be an interface to another computing system or computing component that can be used to receive information or parameters indicating how to mimic the embedded memory based on the memory configuration.

Process 300 continues next at block 310, where a file-management-system manager for the memory is enabled. In various embodiments, the file-management-system manager maintains the protocols, directory services, file services, caching support, scaling, or other features that can be utilized to read, write, and store data on the memory. In some embodiments, the file-management-system manager may be configured to support Azure FileX or LevelX, or other types of embedded file systems. In at least one embodiment, the file-management-system manager may be an interface to another computing system or computing component that can be used to receive information or parameters associated with the management of the file system that is to be stored on the embedded memory.

Process 300 proceeds next to block 312, where a bin image of a file system for the memory is generated based on the memory configuration using the memory simulator and the file-management-system manager. In various embodiments, file allocation table information is obtained via the file-management-system manager, and the memory simulator is employed to generate the bin image by simulating writing of the file tree to the memory using the memory configuration and the file allocation table information.

In various embodiments, a region or portion of the host memory (e.g., the memory of the host computing device 120) is allocated with the size of the embedded memory identified and determined at blocks 302 and 304. The memory simulator enabled at block 308 is employed to format the allocated region to create a clean empty file system based on the memory block size determined at block 304. The file tree obtained at block 306 is parsed and uses the memory simulator to duplicate the exact file tree in term of structure and content in the file system previously created in the memory region. The memory file system content is dumped into a BIN file that is ready to be programmed in the storage embedded memory.

Process 300 continues at block 314, where the bin image is provided to the programmable computing device for storage in the embedded memory. In various embodiments, the bin image may be provided to one or more other programmable computing devices that utilize or have an embedded memory that have a same memory configuration as the memory configuration of the embedded memory identified in blocks 302 and 304. For example, a user can select or identified additional programmable computing devices via a graphical user interface. And if the selected additional programmable computing device has a same memory as the initially identified programmable computing device, then the bin image is loaded onto the memory of the additional programmable computing device. In this way, the bin image can be stored onto the memories of a plurality of programmable computing devices without having to re-generate the bin image each time.

After block 314, process 300 terminates or otherwise returns to a calling process to perform other actions.

The following is a summarization of the claims as filed.

A method may be summarized as including: determining a memory configuration for a memory that is embedded on a programmable computing device; obtaining a file tree identifying a file structure to be used in the memory; generating a bin image of a file system for the memory based on the memory configuration and the file tree using a memory simulator and a file-management-system manager; and storing the bin image in the memory that is embedded on the programmable computing device.

The method may include identifying the memory embedded on the programmable computing device.

Selecting the memory configuration for the memory may include: determining a total size of the memory; determining a block size of the memory; and determining a page size of the memory. Selecting the memory configuration for the memory may include determining a memory type of the memory. Selecting the memory configuration for the memory may include determining the hardware architecture of the memory.

Generating the bin image of the file system for the memory may include: obtaining file allocation table information via the file-management-system manager; and employing the memory simulator to generate the bin image by simulating writing of the file tree to the memory using the memory configuration and the file allocation table information.

The method may include identifying the memory as a NOR flash memory.

The method may include: identifying a second memory of a second programmable computing device having a second memory configuration that matches the memory configuration of the memory; and storing the bin image in the second memory that is embedded on the second programmable computing device.

A computing device may be summarized as including: a memory that store computer instructions; and a processor that, in operation, executes the computer instructions to: identify an embedded memory of a programmable computing device; identify a memory configuration for the embedded memory; obtain a file tree identifying a file structure to be used in the embedded memory; select an memory simulator interface for the embedded memory; select a file management system interface for the file tree; generate a bin image of a file system for the embedded memory based on the memory configuration and the file tree using the memory simulator interface and the file management system interface; and provide the bin image to the programmable computing device to be stored in the embedded memory of the programmable computing device.

The at least one processor, which, in operation, selects the memory configuration for the memory by executing the computer instructions to: determine a total size of the memory; determine a block size of the memory; and determine a page size of the memory.

The at least one processor, which, in operation, selects the memory configuration for the memory by executing the computer instructions to determine a memory type of the memory.

The at least one processor, which, in operation, selects the memory configuration for the memory by executing the computer instructions to determine the hardware architecture of the memory.

The at least one processor, which, in operation, generates the bin image of the file system for the memory by executing the computer instructions to: obtain file allocation table information via the file-management-system manager; and employ the memory simulator to generate the bin image by simulating writing of the file tree to the memory using the memory configuration and the file allocation table information.

The at least one processor, which, in operation, executes the computer instructions to identify the memory as a NOR flash memory.

The at least one processor, which, in operation, executes the computer instructions to: identify a second memory of a second programmable computing device having a second memory configuration that matches the memory configuration of the memory; and store the bin image in the second memory that is embedded on the second programmable computing device.

A non-transitory computer-readable medium having contents that configure a microcontroller to perform a method, the method may be summarized as: selecting a memory configuration for a memory of a programmable computing device; receiving a file tree identifying a file structure to be used in the memory; generating a bin image of a file system for the memory based on the memory configuration and the file tree using a memory simulator of the memory; and storing the bin image in the memory that is embedded on the programmable computing device.

Selecting the memory configuration for the memory may include determining a total size of the memory; determining a block size of the memory; and determining a page size of the memory. Selecting the memory configuration for the memory may include determining the hardware architecture of the memory.

Generating the bin image of the file system for the memory may include: obtaining file allocation table information; and employing the memory simulator to generate the bin image by simulating writing of the file tree to the memory using the memory configuration and the file allocation table information.

The method may include identifying a second memory of a second programmable computing device having a second memory configuration that matches the memory configuration of the memory; and storing the bin image in the second memory that is embedded on the second programmable computing device.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   determining, by a host computing device, a memory configuration for a memory that is embedded on a programmable computing device;
   obtaining, by the host computing device, a file tree identifying a file structure to be used in the memory;
   allocating, by the host computing device, a region of host memory associated with the host computing device based on the memory configuration;
   creating, in the allocated region of host memory, a file system including structure and content in accordance with the file tree by at least simulating writing of the file tree to the memory that is embedded on the programmable computing device;
   generating, by the host computing device, a bin image by dumping the file system data into the bin image; and
   storing the bin image in the memory that is embedded on the programmable computing device, wherein data stored within the bin image is accessible, via a memory interface, to one or more applications executing on the programmable computing device.

2. The method of claim 1, comprising:
   identifying the memory embedded on the programmable computing device.

3. The method of claim 1, wherein determining the memory configuration for the memory comprises:
   determining a total size of the memory;
   determining a block size of the memory; and
   determining a page size of the memory.

4. The method of claim 1, wherein determining the memory configuration for the memory comprises:
   determining a memory type of the memory.

5. The method of claim 1, wherein determining the memory configuration for the memory comprises:
   determining the hardware architecture of the memory.

6. The method of claim 1, further comprising:
   obtaining file allocation table information via a file-management-system manager; and
   employing a memory simulator to simulate writing of the file tree to the memory using the memory configuration and the file allocation table information.

7. The method of claim 1, comprising:
   identifying the memory as a NOR flash memory.

8. The method of claim 1, comprising:
   identifying a second memory of a second programmable computing device having a second memory configuration that matches the memory configuration of the memory; and
   storing the bin image in the second memory that is embedded on the second programmable computing device.

9. A computing device, comprising:
   a memory that store computer instructions; and
   at least one processor that, in operation, executes the computer instructions to:
      identify an embedded memory of a programmable computing device;
      identify a memory configuration for the embedded memory;
      obtain a file tree identifying a file structure to be used in the embedded memory;

allocate a region of the memory of the computing device based on the memory configuration;

create, in the allocated region of the memory, a file system including structure and content in accordance with the file tree by at least simulating writing of the file tree to the embedded memory of the programmable computing device;

generate a bin image by at least dumping the file system data into the bin image; and provide the bin image to the programmable computing device to be stored in the embedded memory of the programmable computing device and to be accessible, via a memory interface, to one or more applications executing on the programmable computing device.

10. The computing device of claim 9, wherein the at least one processor, in operation, selects the memory configuration for the memory by executing the computer instructions to:

determine a total size of the memory;
determine a block size of the memory; and
determine a page size of the memory.

11. The computing device of claim 9, wherein the at least one processor, in operation, selects the memory configuration for the memory by executing the computer instructions to:

determine a memory type of the memory.

12. The computing device of claim 9, wherein the at least one processor, in operation, selects the memory configuration for the memory by executing the computer instructions to:

determine the hardware architecture of the memory.

13. The computing device of claim 9, wherein the at least one processor, in operation, executes the computer instructions to further:

obtain file allocation table information via a file-management-system manager; and employ a memory simulator to simulate writing of the file tree to the embedded memory using the memory configuration and the file allocation table information.

14. The computing device of claim 9, wherein the at least one processor, in operation, executes the computer instructions to:

identify the memory as a NOR flash memory.

15. The computing device of claim 9, wherein the at least one processor, in operation, executes the computer instructions to:

identify a second memory of a second programmable computing device having a second memory configuration that matches the memory configuration of the memory; and store the bin image in the second memory that is embedded on the second programmable computing device.

16. A non-transitory computer-readable medium having contents that configure a microcontroller to perform a method, the method comprising:

selecting a memory configuration for a memory of a programmable computing device;

receiving a file tree identifying a file structure to be used in the memory;

allocating a region of a memory associated with the microcontroller based on the memory configuration;

creating, in the allocated region, a file system including structure and content in accordance with the file tree by at least simulating writing of the file tree to the memory of the programmable computing device;

generating a bin image by at least dumping the file system data into the bin image; and storing the bin image in the memory that is embedded on the programmable computing device to be accessible, via a memory interface, to one or more applications executing on the programmable computing device.

17. The non-transitory computer-readable medium of claim 16, wherein selecting the memory configuration for the memory comprises:

determining a total size of the memory;
determining a block size of the memory; and
determining a page size of the memory.

18. The non-transitory computer-readable medium of claim 16, wherein selecting the memory configuration for the memory comprises:

determining the hardware architecture of the memory.

19. The non-transitory computer-readable medium of claim 16, wherein the memory the method further comprises:

obtaining file allocation table information; and employing a memory simulator to simulate writing of the file tree to the memory using the memory configuration and the file allocation table information.

20. The non-transitory computer-readable medium of claim 16, the method comprising:

identifying a second memory of a second programmable computing device having a second memory configuration that matches the memory configuration of the memory; and storing the bin image in the second memory that is embedded on the second programmable computing device.

* * * * *

UNITED STATES PATENT AND TRADEMARK OFFICE
CERTIFICATE OF CORRECTION

PATENT NO. : 12,210,758 B2
APPLICATION NO. : 17/733779
DATED : January 28, 2025
INVENTOR(S) : Zouhaier Aouaini et al.

It is certified that error appears in the above-identified patent and that said Letters Patent is hereby corrected as shown below:

In the Claims

Column 12, Claim 19, Line 34:
"wherein the memory the method" should read: --wherein the method--.

Signed and Sealed this
Twenty-fifth Day of March, 2025

Coke Morgan Stewart
*Acting Director of the United States Patent and Trademark Office*